H. C. CAUSTON.
ELECTRICALLY HEATED COOKING VESSEL.
APPLICATION FILED MAY 4, 1917.
1,273,821.
Patented July 30, 1918.
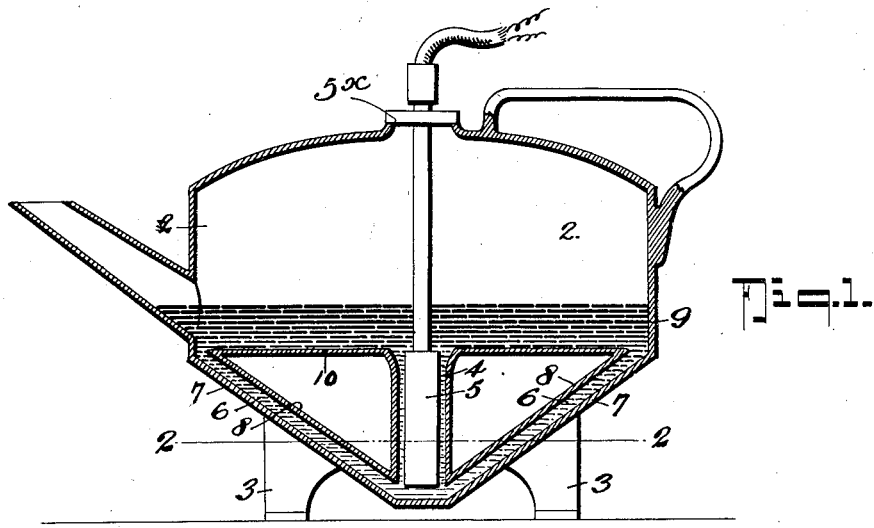
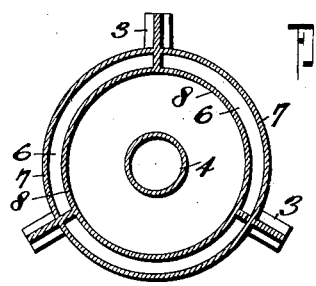
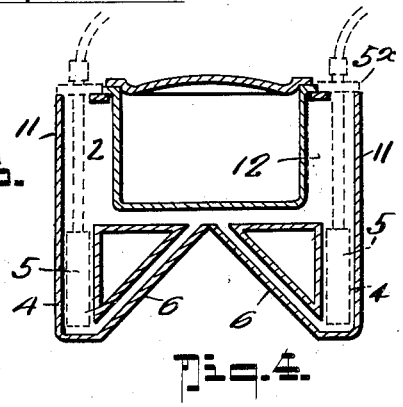
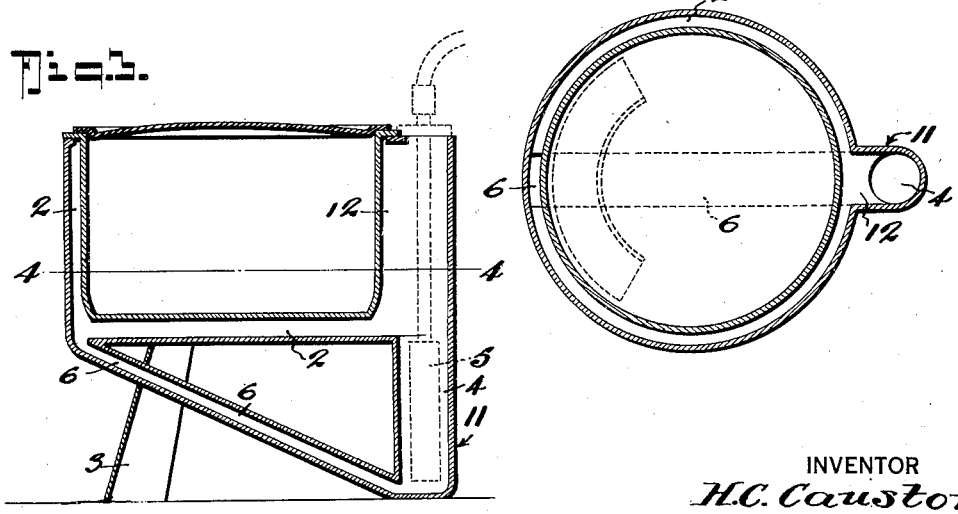
INVENTOR
H.C. Causton.
BY
Fred G. Dieterich
ATTORNEYS

UNITED STATES PATENT OFFICE.

HOWARD C. CAUSTON, OF VANCOUVER, BRITISH COLUMBIA, CANADA.

ELECTRICALLY-HEATED COOKING VESSEL.

1,273,821.   Specification of Letters Patent.   Patented July 30, 1918.

Application filed May 4, 1917. Serial No. 166,422.

*To all whom it may concern:*

Be it known that I, HOWARD C. CAUSTON, a citizen of the Dominion of Canada, residing at Vancouver, in the Province of British Columbia, Canada, have invented certain new and useful Improvements in Electrically-Heated Cooking Vessels, of which the following is a specification.

This invention relates to a domestic kettle or the like cooking vessel adapted for use with an electrical heating unit, the improvements being directed to the provision of a receptacle within which the heating unit may be removably placed, which receptacle is below the bottom of the general volume of the vessel, so as to insure entire immersion of the heating unit with an amount of liquid which is relatively small in proportion to the volume of the vessel.

The invention also comprises provision insuring effective circulation of the liquid past the heating unit.

With these provisions a small quantity of liquid can be economically heated because it surrounds the entire heating surface of the unit, and the liquid contents of a full vessel can be more quickly heated, because of the satisfactory circulation of it past the heating means.

The invention is particularly described in the following specification, reference being made to the drawings by which it is accompanied, in which:

Figure 1 is a vertical section showing the application of this invention to an ordinary domestic kettle.

Fig. 2 is a sectional plan on the line 2—2 in Fig. 1.

Fig. 3 is a vertical section showing the application of the same device to a steam cooker, and Fig. 4 is a plan on the line 4—4 in Fig. 3.

Fig. 5 is a detail section of a modification hereinafter referred to.

In these drawings 2 represents the general volume of the vessel which is supported on a stand 3, at a suitable height to enable a tubular chamber 4 to be downwardly projected from its bottom. This tubular chamber 4 is adapted to receive an electrical heating unit 5, preferably of standard form, which may be removably inserted through the cover of the vessel and is supported clear of the lower end of the chamber 4 in any suitable manner, preferably by suspending it from a collar $5^x$ secured on it, which collar closes the aperture in the cover through which the unit in inserted.

The lower end of this chamber 4 is connected by a duct or ducts 6 with the bottom of the main vessel 2 adjacent its outer wall.

The heating unit 5 being within a limited space which is below the level of the main vessel is completely immersed with a relatively small amount of liquid, so that the current is more advantageously applied to effect the heating of the liquid than if the same amount of liquid was placed in a vessel of larger cross sectional area and the heater was only partially immersed.

Again in providing a means whereby the liquid is delivered to the heating unit from a position in the vessel remote from the location of that heating unit an effective circulation by convection is insured.

Figs. 1 and 2 of the drawing show an application of these principles of construction to an ordinary kettle wherein the chamber 4 for the heating unit is centrally disposed in relation to the plan of the vessel, and the passage 6 may conveniently be provided as the space between an outer inverted cone 7, which is connected to the outer wall 9 of the vessel 2, and a corresponding inner cone 8 secured to the main bottom 10 of the vessel. With this construction the outer cone may, if desired, form the true bottom of the vessel 2 and the inner cone 8 with the bottom 10 and the wall of the tubular chamber 4 may be connected together as one, so as to be removable for purposes of cleansing.

Figs. 3 and 4 show the device as applied to a steam cooker. In this the tubular chamber 4 for the heating unit downwardly projects from one side of the vessel 2 and its wall is upwardly extended, as at 11, to approximately the level of the upper edge of that vessel, an aperture or apertures 12 being provided to connect the upper end of the tubular chamber with the volume of the vessel 2. The circulating ducts 6 may be flattened tubes from the bottom 10 of the vessel 2 on the side opposite the heating chamber 4 to the lower end of the same.

I do not desire to be confined to the exact construction of the vessel here set forth, as the same may be varied to meet the requirements of manufacture, nor do I desire to be confined to the use of one heating chamber in a vessel, such as is illustrated in Figs. 3 and 4, as a heating chamber may be provided on each diametrically opposite side, in which case the circulating duct 6 to the lower end of each heating chamber will be taken from midway between the heating chambers on opposite sides of the vessel, see Fig. 5.

Two heating units will generally be provided for cooking vessels of this kind, so that the liquid may be quickly brought to the boil with both units in use and then one may be removed to maintain the temperature.

Having now particularly described my invention, I hereby declare that what I claim as new and desire to be protected in by Letters Patent, is:

1. A cooking vessel for electrical heating, comprising a vessel having a relatively small heating chamber below the bottom of the vessel, said chamber adapted to removably receive an electrical heating unit, one end of said heating chamber being in direct communication with the volume of the vessel and the other end having separate communication therewith.

2. A cooking vessel for electrical heating, comprising a vessel having a relatively small heating chamber below the bottom of the vessel, said chamber adapted to removably receive an electrical heating unit, one end of said heating chamber being in direct communication with the volume of the vessel and the other end having separate communication therewith from a location remote from the communication of the opposite end.

3. A cooking vessel for electrical heating, comprising a vessel having a relatively small tubular heating chamber downwardly projecting from the bottom of the vessel, said chamber adapted to removably receive an electrical heating unit, the upper end of said heating chamber being in direct communication with the volume of the vessel and the lower end in communication with a part of the vessel remote from the heating chamber.

4. An electrical liquid heater, comprising a vessel having a relatively smaller heating chamber adapted to receive a removable electrical heating unit below the level of the bottom of the vessel, the upper end of which chamber is in direct communication with the main volume of the vessel and the lower end in communication with the same from a location remote from that of the upper end.

5. An electrical liquid heater, comprising a vessel having a tubular heating chamber of relatively small size downwardly projecting from the bottom of the vessel at the center, said chamber adapted to removably receive an electrical heating unit, the upper end of said chamber being in direct communication with the main body of the vessel and the lower end of the same in communication with the vessel from adjacent the walls of the same.

6. An electrical liquid heater, comprising a vessel having a tubular chamber of relatively small dimensions downwardly projecting from the center of its bottom and in direct communication with the vessel, said chamber adapted to receive a removable heating unit, the bottom of the vessel being formed with a substantially conical interspace delivering from the outer zone of the vessel to the lower end of the heating chamber.

7. A cooking vessel having a flat bottom, a tubular projection beneath the bottom of relatively small diameter and having one end in direct communication with the interior of the vessel through the bottom, a duct connected with the other end of said tubular projection and communicating with the interior of the vessel through the bottom at a place remote from the tubular projection, and a removable electric heater projected into and held in said tubular projection.

8. A cooking vessel having a flat bottom, a tubular projection beneath the bottom of relatively small diameter and having one end in direct communication with the interior of the vessel through the bottom, a duct connected with the other end of said tubular projection and communicating with the interior of the vessel through the bottom at a place remote from the tubular projection, a removable electric heater projected into and held in said tubular projection, said vessel having an opening through which said heater is adapted to be introduced, said heater having a cap for closing said opening when the heater is in place.

In testimony whereof I affix my signature.

HOWARD C. CAUSTON.